United States Patent [19]

Frame

[11] 4,266,223
[45] May 5, 1981

[54] THIN PANEL DISPLAY

[75] Inventor: Norman J. Frame, Milwaukee, Wis.

[73] Assignee: W. H. Brady Co., Milwaukee, Wis.

[21] Appl. No.: 967,578

[22] Filed: Dec. 8, 1978

[51] Int. Cl.³ ............................................. H05B 33/26
[52] U.S. Cl. .................................... 340/719; 313/505;
315/169.3; 340/781; 357/45; 358/241
[58] Field of Search ............... 340/719, 781; 313/500,
313/505, 498; 315/169.3; 357/45; 358/59, 241

[56]  References Cited
U.S. PATENT DOCUMENTS

| | | |
|---|---|---|
| 2,684,450 | 7/1954 | Mager et al. . |
| 2,838,715 | 6/1958 | Payne . |
| 2,848,637 | 8/1958 | Mager . |
| 2,928,974 | 3/1960 | Mash . |
| 2,972,692 | 2/1961 | Thornton ......................... 340/781 X |
| 3,082,175 | 3/1963 | Thornton ......................... 340/781 X |
| 3,246,162 | 4/1966 | Chin ................................. 340/781 X |
| 3,312,825 | 4/1967 | Robinson . |
| 3,519,871 | 7/1970 | Kanie . |
| 3,731,353 | 5/1973 | Vecht . |
| 3,743,773 | 7/1973 | Sobel ............................... 340/719 X |
| 3,749,977 | 7/1973 | Sliker .............................. 340/781 X |
| 3,869,646 | 3/1975 | Kirton et al. .................... 340/781 X |
| 3,889,016 | 6/1975 | Vlasenko et al. . |
| 3,889,151 | 6/1975 | Hanak et al. .................... 340/781 X |
| 4,006,383 | 2/1977 | Luo et al. ........................ 340/781 X |
| 4,042,854 | 8/1977 | Luo et al. . |
| 4,156,833 | 5/1979 | Wey et al. ....................... 340/781 X |

OTHER PUBLICATIONS

E. J. M. Kendall, "Transistors," 1969, Pergamon Press, pp. 308–329.
W. A. Thornton, "AC-DC Electroluminescence," Physical Review, vol. 113, No. 5, Mar. 1, 1959.
M. Aven and J. S. Prener, "Physics and Chemistry of II–VI Compounds," 1967, pp. 719, 720.

Primary Examiner—David L. Trafton

[57]  ABSTRACT

A multilayer display device with thin-film transistor circuits for sequentially switching a common brightness control signal to a plurality of individual display elements.

11 Claims, 7 Drawing Figures

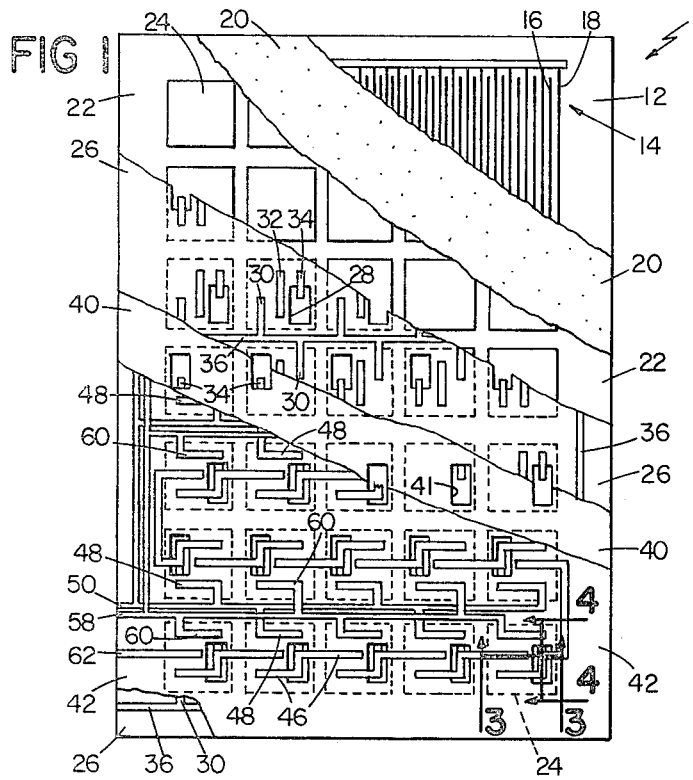

THIN PANEL DISPLAY

FIELD OF THE INVENTION

This invention relates to display panels.

BACKGROUND OF THE INVENTION

In many display applications, including television and alphanumeric displays, it is desirable to have mounted on a thin panel a matrix of discrete, closely-spaced radiation-emitting elements which can be individually controlled over a wide brightness range.

Commercial television and some alphanumeric displays presently rely on the bulky cathode ray tube to control luminescent elements on a display screen. Good brightness range is achieved, and few connection leads are required, but the size of the tube is a drawback for many applications.

Various thin panel display devices have been proposed, but these have generally relied on row and column addressing and thus have required as many as 1040 external connections for controlling a 520 by 520 element display. For example, Luo et al. U.S. Pat. No. 4,042,854 shows an AC-driven electroluminescent display with leads for each row and column and a pair of thin-film transistors and a capacitor at each display element.

When electroluminescent devices are used as the radiation-emitting elements, increased brightness is generally desired, and it is also desirable to produce satisfactorily bright luminescence with the same level DC voltages as are commonly used in CMOS logic devices (approximately 15 volts DC), thereby eliminating the additional cost of converting logic output signals to higher voltages for producing luminescence. A difficulty with conventional electroluminescent devices is that, when a sandwich construction (two area electrodes on either side of a luminescent layer) is used, the transparent electrode placed between the transparent substrate and the luminescent film, by virtue of its thinness and high resistance, contributes to detrimental capacitance effects which limit operating speed and frequency. It would thus be desirable to have an electroluminescent display element with sufficiently thick electrodes all on one side of the luminescent layer.

Several references have shown electroluminescent devices that employ transversely-spaced electrodes on one side of a luminescent layer. Kanie U.S. Pat. No. 3,519,871 and Mash U.S. Pat. No. 2,928,974 show the electrodes positioned opposite the viewing side of the luminescent layer. Kanie suggests direct-current operation and shows a vacuum-deposited luminescent layer. Robinson U.S. Pat. No. 3,312,825 shows AC-sensitive, semiconductive luminescent material filling wide gaps between transversely spaced electrodes. Mager et al. U.S. Pat. No. 2,684,450 shows an AC-sensitive layer composed of a dielectric base material filled with small phosphor particles covering the electrodes. Vecht U.S. Pat. No. 3,731,353 shows a DC-sensitive device that produces luminescence only along narrow zones.

Vlasenko et al. U.S. Pat. No. 3,889,016 shows a method for producing a DC-sensitive electroluminescent film by vacuum deposition.

SUMMARY OF THE INVENTION

In one aspect, the invention features adding a plurality of thin-film transistor circuits to a multilayer display apparatus having a transparent outer layer and a plurality of discrete radiation-emitting elements beneath the outer layer, the circuits being located beneath the radiation-emitting elements, with one circuit being adjacent to and associated with at least one of the elements, and the circuitry including switching means for supplying a common brightness control signal to the control electrode of the associated radiation-emitting element when an arming signal from a preceding circuit and a common timing signal are sensed, means for maintaining the switching means in a conductive state for a time sufficiently long enough to energize the radiation-emitting element, and means for supplying an arming signal to the next successive circuit; leads for supplying the common timing and brightness signals are connected to the circuits and selection means are provided to make adjacent circuits sensitive to different states of said timing signal. State changes in the timing signal cause the transistor circuits to switch the brightness control signal from one radiation-emitting element to another in a continuous scan across the whole display apparatus. In this aspect, the invention provides a means of controlling the brightness of a large matrix of display elements with very few external leads (e.g., four in the preferred embodiment), thereby greatly simplifying the external circuitry required for controlling the display panel. Furthermore, the panel can be manufactured using known thin-film deposition processes in the large dimensions required for television, billboards and the like as well as in smaller dimensions for alphanumeric displays, while also maintaining the desired thinness. In preferred embodiments, two timing signals 180° out of phase with each other are supplied on two separate leads, and the leads are connected alternately to successive circuits to assure that adjacent circuits are not simultaneously responsive to the timing signals; a gate connected to the control electrode serves to latch the switching means on after the arming signal from the preceding circuit has beenn removed; a lead extending from the same gate and thus also connected to the control electrode is connected to a gate of the succeeding circuit and thereby provides the arming signal; the switching means includes a first drain connected to the common brightness signal, a second intermediate drain, a source connected to the control electrode, two gates controlling the connection between the first and second drains, one gate connected to the arming lead from the preceding transistor and the other to the control electrode for latching, and a single timing gate controlling the connection between the second drain and the source, the timing gate being alternately connected in successive circuits to one or the other of two timing signal leads; and the radiation element is an electroluminescent element with an area electrode as the control electrode.

In another aspect, the invention features an electrode grid beneath the outer transparent layer of a display device and a continuous, generally uniform thickness film of electroluminescent materaial vacuum deposited beneath the electrode grid. The electrode grid provides transparency by virtue of the spacing between adjacent electrodes but is much more conductive than transparent electrodes, thereby reducing capacitive effects and extending the maximum frequency of operation. In the most preferred embodiment, the electroluminescent film contacts the grid, is suitably doped with copper and manganese so as to be sensitive to direct current and is subjected to between 15 and 25 volts D.C. and the grid consists of two electrodes having intermeshed narrow portions between 0.5 and 1.5 mils wide and spaced from each other between 0.5 and 5 mils. In another preferred embodiment, a current-limiting layer (e.g., $Y_2O_3$ between 800 and 3000 angstroms thick) is interposed between the grid and electroluminescent material which lacks the copper doping and is operated in a field-induced, AC-voltage luminescence mode.

In still another aspect, the invention features adding a third area electrode beneath the luminescent layer and grid electrodes. Voltage applied to the third electrode modulates the brightness of the luminescence viewed through the transparent substrate. In the most preferred embodiment, an insulating layer is placed between the luminescent layer and the third electrode, the two other electrodes have portions forming an electrode grid, the grid contacts the electroluminescent material to allow current flow through the material, and D.C. voltages are applied to the grid and third electrodes. The D.C. voltage at the third electrode causes "holes" (positive carriers) in the luminescent material to drift toward the electrode grid, thereby creating more recombination centers for luminescence near the grid, whereby the brightness of the luminescence may be controlled by the third electrode potential and greater brightness may be achieved at the low D.C. voltages customarily used with CMOS devices (e.g., 16 volts). In another preferred embodiment, a current-limiting insulating layer separates the electrode grid from the luminescent material, and an AC voltage is applied either to the third electrode or the grid, and a DC voltage is applied to the other; the luminescent material is thus made responsive only to the electric field, and the combination of AC and DC voltages enhance brightness.

In still another aspect, the invention features aligning dipoles within the crystal structure of a layer of electroluminescent material by depositing the material in the presence of an electric field. In preferred embodiments, the electric field is generated by a DC voltage applied across an electrode grid on which the luminescent material is deposited. The aligned-dipole crystal structure exhibits enhanced brightness.

PREFERRED EMBODIMENTS

We turn now to the structure and operation of preferred embodiments of the invention, after first briefly describing the drawings.

DRAWINGS

FIG. 1 is an overall plan view of the most preferred embodiment, with portions of various layers cut away.

FIG. 2 is a perspective view of one corner of said embodiment, with portions cut away and with the semiconductor, insulator, and gate layers shown exploded above underlying layers.

FIG. 3 is a cross-sectional view at 3—3 of FIG. 1.

FIG. 4 is a cross-sectional view at 4—4 of FIG. 1.

FIG. 5 is a schematic view showing electrical operation of said embodiment.

FIG. 6 shows input waveforms.

FIG. 7 is a partial cross-sectional view of a second preferred embodiment at a location equivalent to 3—3 of FIG. 1, showing a current-limiting layer between the electrode grid and the luminescent layer.

STRUCTURE

Referring to FIG. 1, there is shown electroluminescent display panel 10. A five by seven matrix of discrete luminescent elements, which when selectively illuminated form alphanumeric characters, is formed by deposition of various layers on glass substrate 12 (1/16 inch thick), through which the luminescence is observed.

Electrode grid 14 is formed on substrate 12 by vacuum depositing a thin (1000 angstroms) film of aluminium on the upper surface of the substrate and then vaporizing a 1 mil wide convoluted gap using a laser beam focused to that width. This leaves two electrical pathways consisting of 1 mil wide electrode fingers 16, 18 spaced 1 mil apart. Electroluminescent layer 20 of zinc sulfide activated with maganese and copper is vacuum deposited without masking over electrode grid 14 to a thickness of 2 microns, which provides sufficient capacitance. A 25 V.D.C. potential is applied across grid 14 during deposition of layer 20 so as to align dipoles in the zinc sulfide crystalline structure. A forming current is applied to the electroluminescent material after deposition to move copper ions to the grounded electrode of grid 14. The copper ions form a thin p-type region at the grounded electrode. Insulator layer 22 of $Al_2O_3$ is vacuum deposited over layer 20 to a thickness of 3000 angstroms, also without masking. At that thickness of $Al_2O_3$ is transparent. (All vacuum depositing is performed at or below $1\times10^{-5}$ torr.)

Additional layers above layer 22 are deposited using one of six deposition masks. Rear electrodes 24, consisting of thirty-five discrete aluminum squares (30 mils square; spaced 10 mils apart) arranged in a five by seven matrix, are vacuum deposited to a thickness of 2500 angstroms using mask #1, which has square holes. Second insulator layer 26 of $Al_2O_3$ is deposited to a 1000 angstrom thickness over rear electrodes 24, using mask #2 to form rectangular holes 28 with rounded corners.

Above insulator layer 26, a matrix of thin-film switching transistors is deposited. A pattern of three gold electrodes--drains 30, intermediate drains 32, and sources 34—are deposited aligned with each rear electrode 24 to a 1000 angstrom thickness, using mask #3. Drains 30 are all interconnected in one electrical circuit by 1000 micron wide drain lead 36. Each of electrodes 30, 32, 34 is 300 microns wide and spaced 50 microns from adjacent electrodes. Gold is used for electrodes 30, 32, 34 to assure good ohmic contact with semiconductor layer 40. Sources 34 extend over the edge of holes 28 and contact rear electrodes 24 (FIG. 2). To achieve deposition of the gold on the vertical face (FIG. 2) of hole 28, the deposition is performed at oblique angles to layer 26. Semiconductor layer 40 of CdS is deposited over electrodes 30, 32, 34 to a thickness of 3000 angstroms, using mask #2. A third insulator layer 42 of $Al_2O_3$ is deposited over the semiconductor layer, to a thickness of 600 angstroms, also using mask #2. Holes 41, 44 produced in layers 40, 42, respectively, are aligned with hole 28 in layer 26.

Above the insulator and semiconductor layers, a pattern of generally horizontal gate electrodes and associated leads are deposited in two stages. First, timing signal lead 50, branch leads 70, gates 48 and interelement gates 46, all aluminum, are deposited to a thickness of 2000 angstroms, using mask #4. Interelement gates 46 extend downward into aligned holes 28, 41, 44 to contact sources 34 and rear electrodes 24, and deposition is conducted at an oblique angle to layer 42 to assure adequate deposition of gates 46 on vertical faces of holes 28, 41, 44. To insulate at crossover points, insulator spots 56 of $Al_2O_3$ (1000 angstroms thick) are deposited over selected areas of lead 50 and gates 48 (FIG.

2), using mask #5. Finally, second timing signal lead 58, branch leads 72, and gates 60 are deposited, to a thickness of 2000 angstroms, using mask #6. Timing signal leads 50, 58 are 1000 microns wide; gates 46, 48, 60 are 300 microns wide. Epoxy potting (not shown) is applied over the entire upper surface for sealing and insulating. A separate lead 62, carrying a start signal, serves as a gate for the lower left-hand element (FIG. 1). Six leads extend to the lower left-hand edge of panel 10 (FIG. 1) for making external connections: timing signal leads 50, 58; start signal lead 62; drain lead 36; and leads (not shown) connecting electrode fingers 18, 20.

After deposition of each of the various layers, monolayers (layers only one molecule thick) of adsorbed gases are cleaned off by glow discharge bombardment before deposition of succeeding layers.

Referring to FIG. 7, there is shown a second embodiment in which insulator layer 90 of $Y_2O_3$ (1300 angstroms thick) is deposited over electrodes 16, 18 to limit current flowing through the luminescent layer. In that embodiment, a phosphor layer sensitive to alternating current is used, for example, ZnS:Mn without copper doping.

Operation

Display panel 10 consists of 35 individual luminescent elements. Each element is energized by a low D.C. voltage (between 5 and 10 V.D.C.) applied across electrodes 16, 18 (FIG. 5) and by a second D.C. voltage (4–15 V.D.C.) applied to rear electrode 24. The voltage across electrodes 16, 18 is set low enough that it alone is insufficient to cause significant visible luminescence; rear electrode 24 must also be energized for significant luminescence to occur. One of electrodes 16, 18 is grounded. The positive voltage at electrode 24 causes "holes" (positive carriers) in the electroluminescent material to drift toward electrodes 16, 18, thereby providing more recombination centers in the grid region and thus more visible luminescence. Insulator layer 22 isolates electrode 24 to provide field-effect operation.

The voltage across electrodes 16, 18 is supplied by voltage source 92 (FIG. 5) on leads not shown in the figures. The voltage applied at each of the thirty-five electrodes 24 corresponds to the instantaneous value of $V_{DD}$ (FIGS. 5 and 6) during the interval in which a particular electrode 24 is energized. The matrix of interconnected thin film transistors sequentially energizes individual electrodes 24 by switching $V_{DD}$ onto the electrodes in a periodic scan.

Start signal T (a short-duration 4 V.D.C. pulse) on lead 62 begins the scan by putting into saturation the transistor formed by gate 62, drain 30 and intermediate drain 32 in the first matrix element in the lower left-hand corner of the panel (FIGS. 1 and 2), in effect closing a first switch across drains 30, 32 (FIG. 6). Coincident with this action, signal $S_2$ (4 V.D.C. in high state; 0.0 V.D.C. in low) on lead 58 drives into saturation the transistor defined by gate 60, intermediate drain 32, and source 34 in effect closing a second switch (FIG. 6). With both first and second switches simultaneously closed, electrode 24 is energized by signal $V_{DD}$ and luminescence occurs at the first element in proportion to the voltage level of $V_{DD}$. The $V_{DD}$ signal also appears on interelement gate 46, which is common with source 34, and thus serves as a latch to hold closed the first switch, between drains 30, 32, after start signal T disappears.

At the end of the first time interval, $S_2$ goes low (0.0 V.D.C.), and $S_1$ goes high (4 V.D.C.) (FIG. 6). This has the effect of de-energizing the first electrode 24 (because the second switch is opened) and energizing the next downstream electrode 24. The $V_{DD}$ voltage on interelement gate 46 has armed the next element by closing the first switch (one portion of the gate acting as an arming lead), and signal $S_1$ on lead 50 and gate 48 has closed the second switch. The first switch is then held closed by the latching effect of the second interelement gate 46.

Each element in the five by seven matrix is thus periodically energized by $V_{DD}$. Sufficient luminescence persistence is provided by the manganese activated zinc sulfide to allow a 1/75 second period between successive applications of $V_{DD}$ to any one element. Return lead 80 connects the interelement gate 46 of the last element through diode 82 to start gate 62. Diode 84 works in conjunction with diode 82 to prevent start signal T from energizing return lead 80 and vice versa. Both diodes are mounted on the periphery of panel 10.

The minimum voltage level of signal $V_{DD}$ is selected to be high enough to latch the first switch of each element while not also causing any visible luminescence, and the maximum voltage level of $V_{DD}$ corresponds to maximum desired luminescence.

To prevent simultaneous energization of all elements, timing signals $S_1$ and $S_2$ have non - coincident edges, $S_2$ going low slightly before $S_1$ goes high and similarly for successive time periods. Inherent capacitance holds interelement gates 46 on a sufficient time for the succeeding element to latch on.

In the most preferred embodiment, luminescence is caused by current conduction through layer 20 between electrodes 16, 18, the amount of current being modulated by the voltage $V_{DD}$ applied to rear electrodes 24. In the second preferred embodiment shown in FIG. 7, luminescence is a function wholly of the fields applied across grid electrodes 16, 18 and to rear electrode 24. Insulating layer 90 of $Y_2O_3$ prevents current flow across the grid. To operate the second embodiment, a lowlevel AC voltage is applied across grid electrodes 16, 18, and a DC voltage is used on rear electrode 24 to modulate the luminescence. The combination of AC and DC voltage signals gives improved brightness. See the article by W. A. Thornton entitled "AC - DC Electroluminescence" published in Physical Review, Vol. 113, No. 5, on March 1, 1959, wherein an AC-modulated DC voltage was applied in a two-electrode structure across a luminescent layer sandwiched between electrodes.

Application of the 25 V.D.C. potential across grid electrodes 16, 18 during deposition of the luminescent layer influences the crystal structure of the ZnS during nucleation, agglomeration, and subsequent growth stages sufficiently to better expose luminescent portions of the ZnS and thereby increase brightness.

Other Embodiments

Other embodiments of the invention will occur to those skilled in the art. For example, the number of display elements could be increased to television requirements (e.g., 520 by 520); the display panel could be broken into individual matrices, controlled by separate timing and brightness controls, in order to accommodate limited persistence in the electroluminescent material; the electroluminescent display elements could be replaced by other radiation-emitting devices, such as liquid crystal or gas plasma displays; and an electroluminescent display element with a sandwich construction, one electrode on either side of the luminescent layer, could substitute for the preferred three electrode structure.

Further, electrode grid 14 could be divided into a plurality of individual grids, and rear electrodes 24 eliminated, so as to produce luminescence solely by either AC or DC excitation applied directly to the grids. Voltage levels required would parallel those of AC and DC sandwich construction devices already known in the art. The thickness of electroluminescent layer 20 could be reduced to less than 3000 angstroms, and apertures could be provided in layer 20 to connect with the switching circuits, or other external switching means could be provided.

What is claimed is:

1. A multilayer display apparatus, comprising:
    an outer layer;
    a plurality of separate radiation-emitting portions beneath said outer layer, each said portion including a control electrode for energizing said portion and said outer layer being transparent to the radiation emitted by said portions;
    a plurality of thin-film transistor circuits beneath said portions, each said circuits being adjacent and associated with at least one of said portions and connected thereto via said control electrode;
    timing lead means connected to each said transistor circuit for supplying a common timing signal to said circuits;
    brightness lead means connected to each said transistor circuit for supplying a common brightness control signal to said circuits;
    arming lead means extending between said circuits for supplying arming signals generated by individual said circuits to succeeding said circuits, said arming lead means thereby connecting said plurality of circuits in series;
    selection means for making a first group of said circuits sensitive only to a first state of said timing signal and for making a second group sensitive only to a second state of said timing signal, said circuits of said second group being interposed in said series between circuits of said first group, whereby adjacent circuits in said series are not sensitive to the same state of said timing signal;
    said transistor circuits including,
        switching means for supplying said common brightness control signal from said brightness lead means to said control electrode to said adjacent display portion when the arming signal from a preceding circuit and said common timing signal are sensed,
        means for maintaining said switching means in a conductive state, wherein said brightness signal is supplied to said control electrode, for a time sufficient to energize said radiation-emitting portion, and
        means for supplying an arming signal to said arming lead means for arming the successive circuit in said series,
    whereby successive state changes in said timing signal between said first and second states cause successive said transistor circuits in said series to be activated, thereby energizing successive said radiation-emitting portions in a scanning movement.

2. The display apparatus of claim 1 wherein
    said timing lead means includes first and second timing leads for carrying first and second timing signals and
    said selection means includes branch leads connecting said first and second timing leads to alternate said transistor circuits in said series.

3. The display apparatus of claim 2 wherein said first timing lead is connected by said branch leads to the first and every other odd numbered circuit in said series,
    said second timing lead is connected by said branch leads to the second and every other even numbered circuit in said series, and
    said first and second timing signals are pulse trains charging between high and low voltage states and are 180° out of phase with each other,
    whereby adjacent circuits in said series do not simultaneously sense the high state of a timing signal.

4. The display apparatus of claim 1 wherein said means to maintain said switching means of said transistor circuits in a conductive state includes latching means operative during an interval in which said timing signal is sensed and after said arming signal is removed.

5. The display apparatus of claim 4 wherein said latching means comprises to gate supplied with the voltage at said control electrode, whereby said brightness control signal voltage applied at said control electrode provides the voltage required for latching.

6. The display apparatus of claim 1 wherein
    said arming lead means comprises an arming lead connected to a gate of the succeeding transistor in said series and
    said means for supplying an arming signal comprises a lead connecting said control electrode to said arming lead,
    whereby said brightness control voltage applied at said control electrode provides said arming signal.

7. The display apparatus of claim 1 wherein
    said transistor circuits each comprise
        first, second and third gates, said first gate being connected to said control electrode of said associated radiation-emitting element,
        a semiconductor layer beneath said gates,
        first and second drains and a source beneath said semiconductor layer, said source being connected to said control electrode and said first gate,
    said timing lead means comprises first and second timing leads for supplying first and second timing signals to alternate circuits in said series, said first and second timing signals being pulse trains changing between high and low voltage states and being 180° out of phase with each other,
    said brightness lead means comprises a brightness control lead connected to said first drain,
    said arming lead means comprises a plurality of arming leads connected between the control electrode of each said circuit and said second gate of the succeeding circuit,
    said selection means comprises branch leads connecting said first timing lead to said third gates of odd numbered circuits in said series and said second timing lead to said third gates of even numbered circuits in said series,
    whereby a timing signal state change which supplies a high voltage to said third gate of a said circuit causes conduction between said second drain and said source and the presence of an arming signal at said second gate causes conduction between said first and second drains, thereby connecting said brightness control signal to said control electrode and simultaneously supplying said brightness control signal to said first gate and said arming lead, said arming lead supplying said signal to said second gate of the succeeding circuit in said series to arm that circuit in preparation for the next state change of said timing signal.

8. The display apparatus of claim 1 wherein said control electrodes are third electrodes of said elements and said apparatus further includes two other electrodes being positioned on the side of said luminescent material opposite said third electrode and having transversely intermeshed portions forming an electrode grid, whereby potentials applied to said third electrodes by said brightness control signal switched by said transistor circuits control the brightness of said elements.

9. A multilayer display apparatus, comprising:
a transparent outer layer,
a first and a second electrode beneath said outer layer, each said electrode having portions transversely spaced from portions of the other said electrode,
a layer of electroluminescent material beneath said first and second electrodes,
a third electrode beneath said luminescent layer, said third electrode extending transversely over a display area of said luminescent layer and said display area defining an individual display element of said display apparatus, and
an insulating layer between said luminescent layer and said third electrode, whereby current is substantially prevented from flowing at said third electrode and voltage applied to said third electrode may create a field in said electroluminescent material to move charge carriers normal to said electrode such that the brightness of luminescence visible through said transparent outer layer is varied.

10. The display apparatus of claim 9 further comprising a current - limiting layer between said electroluminescent material and said first and second electrodes, whereby current is substantially prevented from flowing between said first and second electrodes and luminescence is influenced by the electric field generated between said electrodes.

11. The display apparatus of claim 9 wherein
said apparatus further comprises
an insulating layer beneath said luminescent layer and
a plurality of third electrodes in addition to said first mentioned third electrode beneath said insulating layer, each said third electrode extending transversely over a display area of said luminescent layer and said display areas defining a matrix of individual display elements and
said first and second electrode each have a plurality of portions transversely intermeshed with and spaced from corresponding portions of the other said electrode to form an electrode grid extending across an area encompassing a plurality of said display areas,
whereby energization of said grid for said plurality of display areas is accomplished by application of a potential to said first and second electrodes and the luminescence at individual display areas is controlled by the potential applied to said third electrodes.

* * * * *

UNITED STATES PATENT AND TRADEMARK OFFICE
CERTIFICATE OF CORRECTION

PATENT NO. : 4,266,223

DATED : May 5, 1981

INVENTOR(S) : Norman J. Frame

It is certified that error appears in the above-identified patent and that said Letters Patent are hereby corrected as shown below:

Column 2, line 59, "materaial" should be --material--;

Column 4, line 38, "sources 34-are" should be --sources 34--are--;

Column 8, line 24, "comprises to gate" should be --comprises a gate--.

Signed and Sealed this

Twenty-fifth Day of August 1981

[SEAL]

Attest:

GERALD J. MOSSINGHOFF

Attesting Officer

Commissioner of Patents and Trademarks